G. MACLOSKIE AND C. A. IVES.
SAFETY CAR CONTROL AND AIR BRAKE EQUIPMENT.
APPLICATION FILED JULY 7, 1921.
1,419,873. Patented June 13, 1922.
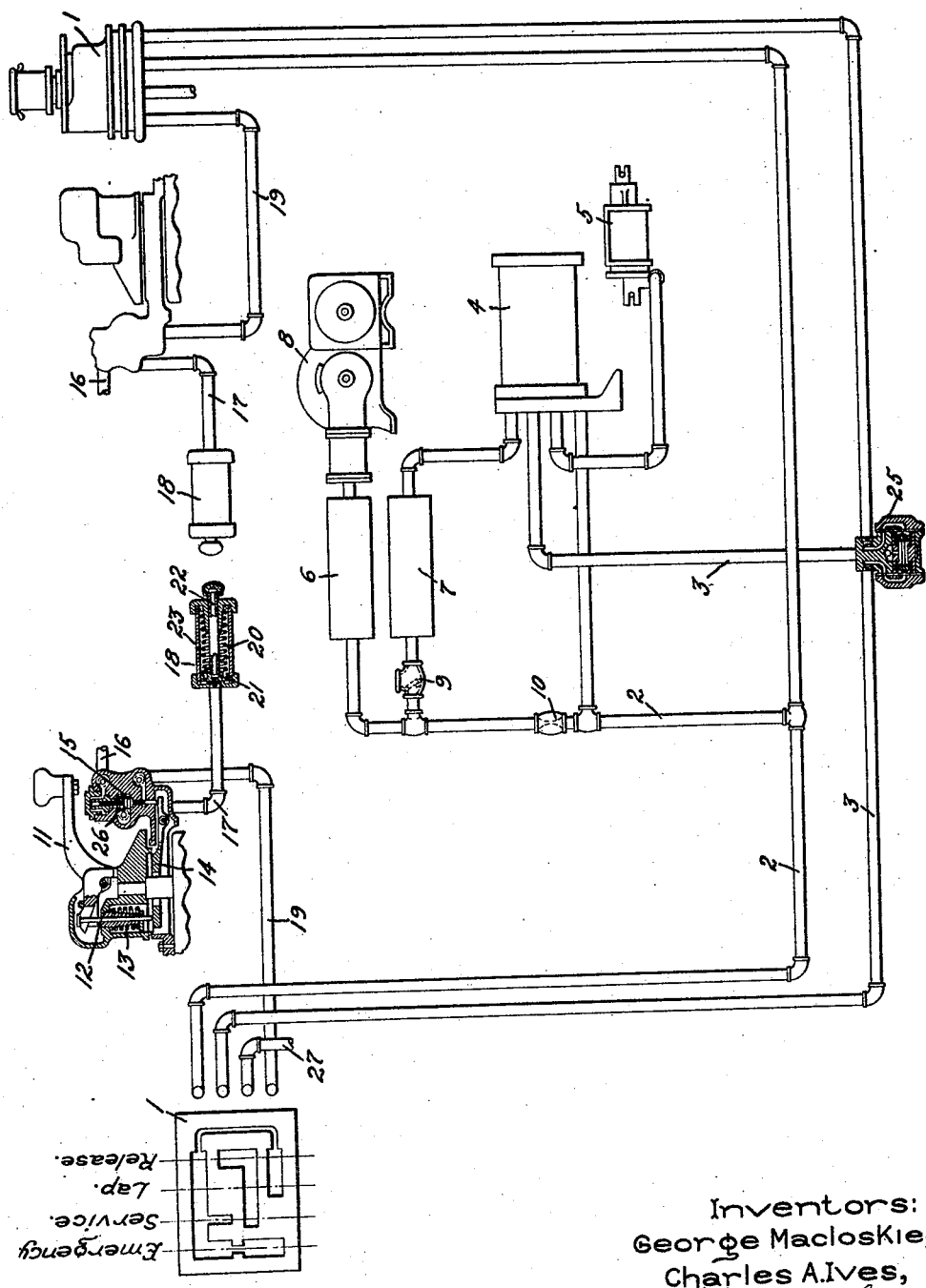
Inventors:
George Macloskie,
Charles A. Ives,
by
Their Attorney.

UNITED STATES PATENT OFFICE.

GEORGE MACLOSKIE AND CHARLES A. IVES, OF ERIE, PENNSYLVANIA, ASSIGNORS TO GENERAL ELECTRIC COMPANY, A CORPORATION OF NEW YORK.

SAFETY CAR CONTROL AND AIR-BRAKE EQUIPMENT.

1,419,873. Specification of Letters Patent. Patented June 13, 1922.

Application filed July 7, 1921. Serial No. 483,094.

*To all whom it may concern:*

Be it known that we, GEORGE MACLOSKIE and CHARLES A. IVES, citizens of the United States, residing at Erie, county of Erie, State of Pennsylvania, have invented certain new and useful Improvements in Safety Car Control and Air-Brake Equipments, of which the following is a specification.

Our invention relates to safety car control and air brake equipments, and particularly to such equipments in which an emergency application of the brakes is produced and the power to the car motors is cut off when the motorman releases one of his handles such as the handle of his controller at the operating end of the car.

One object of our invention is to provide a simplified equipment whereby the motorman may release his controller handle when the motorman's brake valve is in certain positions without producing an emergency application of the brakes or cutting off the power to the car motors.

Our invention will be better understood from the following description taken in connection with the accompanying drawing, and its scope will be pointed out in the appended claims.

In the accompanying drawing, the single figure is a diagrammatic view partly in section of a double end safety car control and air brake equipment embodying our invention.

Referring to the drawing the air brake equipment shown is an emergency straight air brake system of the type disclosed in the Macloskie Patent No. 1,297,884, patented March 18, 1919, and assigned to the same assignee as this application. This equipment comprises a motorman's brake valve 1, at each end of the car, an emergency line 2, a train line 3, an emergency valve 4, a brake cylinder 5 and two main reservoirs 6 and 7 supplied with fluid under pressure from the compressor 8 and connected together by means of the one-way check valve 9 which is connected so that fluid can only flow from the reservoir 6 to the reservoir 7. The reservoir 6 is connected directly to the emergency line 2 through a restricted passage such as the choke fitting 10 and the reservoir 7 is connected to the emergency line 2 through the emergency valve 4 in the well known manner. This air brake equipment is well known in the art and therefore a complete description thereof is deemed unnecessary. For a more complete description reference may be had to the Macloskie patent above referred to.

At each end of the car means are provided for connecting the emergency line 2 to atmosphere when the motorman releases the handle of the motor controller. Each controller is provided with a handle 11 having a finger adapted to engage the head of a plunger bolt 12 which is acted upon by a coil spring 13. As long as the handle 11 is depressed by the motorman, the bolt 12 is held out of engagement with one end of a pivoted lever 14, the opposite end of which engages the stem of a double seating pilot valve 15. In one position of the pilot valve communication is established between the exhaust pipe 16 and a pipe 17 which is connected to a circuit breaker operating device 18. In the other position of the pilot valve communication is established between the pipe 17 and a pipe 19 which is connected to the motorman's brake valve 1.

The circuit breaker operating device 18 comprises a piston chamber 20 containing a piston 21 provided with a stem 22 which is adapted to operate the lever of a circuit breaker (not shown) when fluid is supplied to the piston chamber 20. When the piston moves out to a certain position it uncovers the port 23 so that fluid is vented from the pipe 17.

According to our invention communication through the pipe 19 is controlled by the motorman's brake valve 1. As shown in the drawing, when the motorman's brake valve is in the lap, release or emergency position communication is established between the emergency line 2 and the pipe 19 so that if the motorman releases the controller handle 11 while the motorman's valve is in any one of these positions, fluid is vented from the emergency line and an emergency application of the brakes is produced and the circuit breaker operating device 18 is operated to open the circuit breaker controlled thereby. When the motorman's brake valve 1 is in the service position, communication between the emergency line 2 and the pipe 19 is cut off so that if the motorman releases the controller handle 11 while the motorman's brake valve 1 is in this position an emergency application of the brakes is not produced and the circuit breaker operating device 18 is not opened.

A double check valve 25 of the well-known back-acting type is interposed in the train line 3 to control the communication between the motorman's brake valves and the emergency valve 4.

The operation of the equipment shown is as follows:—Let it be assumed that the car is being operated from the end where the motorman's brake valve shown on the left-hand side of the drawing is situated; that this motorman's brake valve is in the release position and that the double check valve 25 is in the position shown, in which position communication is established between the portion of the train line 3 which is connected to the motorman's brake valve 1 at the operating end of the car and the portion of the train line which is connected to the emergency valve 4 and communication is cut off between the portion of the train line which is connected to the emergency valve 4 and the portion which is connected to the motorman's valve 1 at the non-operating end of the car. The motorman's valve at the non-operating end of the car is in the service position which is the handle-off position.

Under these conditions, the portion of the train line 3 which is connected to the motorman's brake valve at the non-operating end of the car is supplied with fluid under pressure from the emergency line 2 and the portion of the train line which is connected to the motorman's valve at the operating end of the car is connected to the exhaust pipe 27. Consequently, the double check valve 25 is maintained in the position shown so that communication is established between the portion of the train line which is connected to the motorman's valve at the operating end of the car and the portion of the train line which is connected to the emergency valve 4.

When the motorman makes a service application of the brakes, he moves the motorman's brake valve to the service position. In this position the train line 3 is connected to the emergency line 2 so that fluid under pressure is supplied to the brake cylinder 5 through the emergency valve 4. The brakes are released after a service application by moving the motorman's brake valve at the operating end to the release position, in which position the train line 3 is connected to atmosphere through the exhaust pipe 27.

When the motorman makes an emergency application of the brakes he moves the motorman's brake valve at the operating end to the emergency position. In this position, the emergency line 2 is connected to atmosphere, thereby effecting the operation of the emergency valve 4 in the well-known manner to establish communication between the brake cylinder 5 and the main reservoir 7. The brakes are released after an emergency application by moving the motorman's brake valve to the release position. As soon as the communication between the emergency line 2 and atmosphere is cut off the pressure in the emergency line builds up and when normal pressure is restored the emergency valve 4 operates in the well-known manner to connect the brake cylinder 5 to the train line 3 which is connected to atmosphere when the motorman's brake valve is in the release position.

As long as the motorman maintains the controller handle 11 at the operating end of the car depressed, the spring 26 maintains the pilot valve 15 in the position shown, in which position communication is established between the pipes 16 and 17 and communication is cut off between the pipes 17 and 19. When the motorman releases the handle 11 the pilot valve 15 is operated to cut off communication between the pipes 16 and 17 and to establish communication between pipes 17 and 19. If the motorman releases the controller handle 11 at the operating end while the motorman's brake valve is in any one of its positions, except the service position, fluid is vented from the emergency line 2 through the pipes 19 and 17, the piston chamber 20 of the circuit breaker operating device 18, and port 23 thereby actuating the piston 21 so as to open the circuit breaker controlled thereby and thus cut off the power to the car motors. The venting of fluid from the emergency line 2 produces an emergency application of the brakes in a well known manner. If, however, the motorman moves the motorman's brake valve 1 to the service position before he releases the controller handle an emergency application of the brakes will not be produced, nor will the power to the car motors be cut off because in this position of the motorman's brake valve the communication between the emergency line 2 and the pipe 19 is cut off.

When the motorman desires to operate the car from the opposite end he first moves the motorman's brake valve at the operating end to the service position, which is the handle-off-position, so that the brakes are applied and the portion of the train line 3 which is connected to the motorman's valve at the operating end is filled with fluid under pressure. He then releases the controller handle 11 at the operating end. When the motorman reaches the opposite end of the car he depresses the controller handle 11 at that end and then moves the motorman's brake valve to the release position so that fluid is vented from the portion of the train line 3 which is connected to the motorman's valve at that end of the car. The pressure in the portion of the train line which is connected to the motorman's valve at the former operating end then operates the back-acting check valve 25 so that it establishes communication between the emergency valve 4 and the motorman's brake valve at the new operating end and then the brakes may be controlled by the motorman's brake valve and the safety car control equipment at the new operating end in the manner above described.

While we have shown and described one embodiment of our invention, we do not desire to be limited to this specific arrangement, but seek to cover in the appended claims all those modifications which fall within the true spirit and scope of our invention.

What we claim as new and desire to secure by Letters Patent of the United States, is,—

1. In a safety car control and air brake equipment, the combination with an emergency line, a manually controlled handle, and a circuit breaker operating device arranged to control the circuit of the car motors, of a valve device actuated by the said handle when released to establish communication between said emergency line and said circuit breaker operating device, and a motorman's brake valve adapted to control said communication between said emergency line and said circuit breaker operating device.

2. In a safety car control and air brake equipment, the combination with an emergency line, and a manually controlled handle, of a pilot valve actuated by said handle when released to establish communication between said emergency line and atmosphere, and a motorman's brake valve adapted to control said communication between said emergency line and atmosphere.

3. In a safety car control and air brake equipment, the combination with an emergency line, and a manually controlled handle, of a pilot valve actuated by said handle when released to establish communication between said emergency line and atmosphere, and a motorman's brake valve having a position for effecting a straight air application of the brakes and in which position said communication between said emergency line and atmosphere is cut off.

4. In a safety car control and air brake equipment, the combination with an emergency line, and a manually controlled handle, of a pilot valve actuated by said handle when released to establish communication between said emergency line and atmosphere, and a motorman's brake valve adapted to open said communication between said emergency line and atmosphere when in its release and lap positions, and to close said communication in its straight air service position.

5. In a safety car control and air brake equipment, the combination with an emergency line, a manually controlled handle, and a circuit breaker operating device arranged to control the circuit of the car motors, of a valve device actuated by the said handle when released to establish communication between said emergency line and said circuit breaker operating device, and a motorman's brake valve having a position for effecting a straight air application of the brakes and in which position said communication between said emergency line and said circuit breaker operating device is cut off.

6. In a safety car control and air brake equipment, the combination with an emergency line, a manually controlled handle, and a circuit breaker operating device arranged to control the circuit of the car motors, of a valve device actuated by the said handle when released to establish communication between said emergency line and said circuit breaker operating device, and a motorman's brake valve adapted to open said communication between said emergency line and said circuit breaker operating device when in its release and lap positions and to close said communication in another one of its positions.

In witness whereof, we have hereunto set our hands this 27th day of June, 1921.

GEORGE MACLOSKIE.
CHARLES A. IVES.